(12) United States Patent
Benner et al.

(10) Patent No.: US 8,949,569 B2
(45) Date of Patent: Feb. 3, 2015

(54) ENHANCED DIRECT MEMORY ACCESS

(75) Inventors: Alan Frederic Benner, Poughkeepsie, NY (US); Shmuel Ben-Yehuda, Haifa (IL); Zorik Machulsky, Gesher HaZiv (IL); Julian Satran, Atlit (IL); Leah Shalev, Zichron-Yaakov (IL); Ilan Shimony, Haifa (IL); Thomas Basil Smith, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 12/111,968

(22) Filed: Apr. 30, 2008

(65) Prior Publication Data
US 2009/0276571 A1 Nov. 5, 2009

(51) Int. Cl.
*G06F 9/26* (2006.01)
*G06F 9/38* (2006.01)
*G06F 12/08* (2006.01)

(52) U.S. Cl.
CPC ............ *G06F 9/3851* (2013.01); *G06F 9/3824* (2013.01); *G06F 12/0877* (2013.01); *G06F 12/0891* (2013.01)
USPC ............................. 711/203; 711/118; 711/154

(58) Field of Classification Search
CPC . G06F 9/3851; G06F 9/3824; G06F 12/0877; G06F 12/0891
USPC ........................................................ 711/203
See application file for complete search history.

(56) References Cited

U.S. PATENT DOCUMENTS

| | | | | |
|---|---|---|---|---|
| 5,745,778 A | * | 4/1998 | Alfieri | 712/1 |
| 7,178,145 B2 | * | 2/2007 | Bono | 718/100 |
| 7,318,127 B2 | * | 1/2008 | Hrusecky et al. | 711/145 |
| 7,509,484 B1 | * | 3/2009 | Golla et al. | 712/225 |
| 8,051,418 B1 | * | 11/2011 | Dice | 718/102 |
| 2002/0138717 A1 | * | 9/2002 | Joy et al. | 712/235 |
| 2003/0120892 A1 | * | 6/2003 | Hum et al. | 711/202 |

(Continued)

FOREIGN PATENT DOCUMENTS

WO WO2006042108 A1 4/2006

OTHER PUBLICATIONS

Tai-Yi Huang et al., "Method for bounding the effect of DMA I/O interference on program execution time", Proceedings—Real-Time Systems Symposium, 1996, p. 275-285 Conference: Proceedings of the 1996 17th IEEE Real-Time Systems Symposium, Dec. 4-6, 1996, Washington, DC, USA Sponsor: IEEE.

*Primary Examiner* — April Y Blair
*Assistant Examiner* — Prasith Thammavong
(74) *Attorney, Agent, or Firm* — Jason H. Sosa; Suzanne Erez

(57) ABSTRACT

A method for facilitating direct memory access in a computing system in response to a request to transfer data is provided. The method comprises selecting a thread for transferring the data, wherein the thread executes on a processing core within the computing system; providing the thread with the request, wherein the request comprises information for carrying out a data transfer; and transferring the data according to the request. The method may further comprise: coordinating the request with a memory management unit, such that virtual addresses may be used to transfer data; invalidating a cache line associated with the source address or flushing a cache line associated with the destination address, if requested. Multiple threads can be selected to transfer data based on their proximity to the destination address.

20 Claims, 5 Drawing Sheets

(56) References Cited

U.S. PATENT DOCUMENTS

| | | | |
|---|---|---|---|
| 2003/0236962 A1* | 12/2003 | Venkatraman | 711/207 |
| 2006/0037017 A1* | 2/2006 | Accapadi et al. | 718/100 |
| 2006/0206635 A1 | 9/2006 | Alexander et al. | |
| 2007/0113233 A1* | 5/2007 | Collard et al. | 718/101 |
| 2007/0192545 A1* | 8/2007 | Gara et al. | 711/141 |
| 2011/0066830 A1* | 3/2011 | Wolfe et al. | 712/228 |

* cited by examiner

ENHANCED DIRECT MEMORY ACCESS

COPYRIGHT & TRADEMARK NOTICES

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to multiprocessing computing environments and, more particularly, to a system and method for facilitating direct memory access.

BACKGROUND

Modern computing systems include direct memory access (DMA) capability which allows certain hardware subsystems to move data independently of the central processing unit (CPU). In systems without DMA, the CPU may have to transfer each individual piece of data from a source to a destination. Without DMA, the CPU is typically occupied for the duration of a memory operation (i.e., read, write, copy, etc.) and therefore unavailable for other tasks involving CPU bus access.

Using DMA, a computing system can transfer data with much less CPU overhead. A DMA engine may be used to move data between an I/O device and main memory, in either direction, or between two memory regions. DMA allows a CPU to initiate a data transfer, and proceed to perform other operations while the data transfer is managed by the DMA engine. A DMA transfer essentially copies a block of memory from one device to another, such as a block of memory from system RAM to a buffer on the device.

A DMA operation removes certain processing overhead for data transfer from the CPU. Additionally, a DMA operation may be performed asynchronously with the CPU, which allows for effective overlap with CPU operations. In other words, the CPU may perform other operations concurrently during a DMA operation.

Current systems for DMA are popular and efficient; however, they suffer from two main drawbacks. Most systems are based on a hardware design, which is inherently inflexible. A hardware based DMA requires the utilization of physical addresses for the source and destination addresses. Therefore, if virtual addresses are used, the DMA engine must be configured to pin down the data (i.e., prevent swapping out memory regions to secondary storage) prior to translation from virtual to physical addresses, and keep the memory pinned down until the data transfer is complete, since a data transfer cannot be stopped and restarted if a page fault occurs.

Moreover, current designs cannot keep up with the complexity of modern bus designs (i.e., front side busses (FSBs)) and cache coherency protocols. Modern FSBs are complex, highly pipelined busses, designed for maximizing the performance of CPU to system memory access. At the same time, modern FSB designs strive to provide cache coherency between system memory and caches, and between processors in a multiprocessor system. If the DMA engine fails to support all the features of modern FSBs, the system performance suffers, and the DMA engine may even force the FSB to stall or slow down while a DMA transaction is in progress. Further, current hardware based DMA systems fail to take advantage of the highly threaded nature of the new class of processors which provide fine-grained chip multithreading.

Methods and systems are needed that can overcome the aforementioned shortcomings by providing efficient and flexible data movement, while at the same time taking advantage of the efficient way in which the CPU accesses main memory.

SUMMARY

The present disclosure is directed to systems, methods and corresponding products that facilitate direct memory access in a computing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for facilitating direct memory access in a computing system in response to a request to transfer data is provided. The method comprises selecting a thread for transferring the data, wherein the thread executes on a processing core within the computing system; providing the thread with the request, wherein the request comprises information for carrying out a data transfer; and transferring the data according to the request. In some embodiments, the method may further comprise: coordinating the request with a memory management unit, such that virtual addresses may be used to transfer data; and depending on implementation invalidating a cache line associated with the data's source address; or flushing a cache line associated with the data's destination address, as requested.

In accordance with another embodiment, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present disclosure is directed to systems and corresponding methods that facilitate direct memory access using software.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
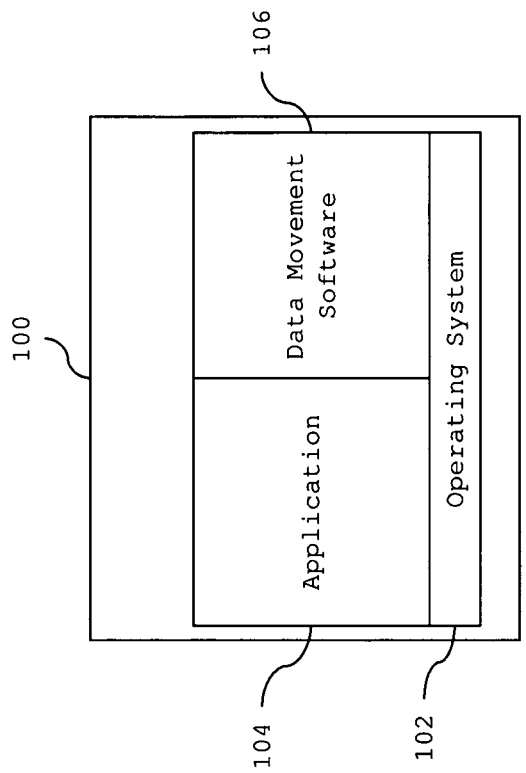
FIG. 1 illustrates a block diagram of an exemplary operating environment in accordance with one or more embodiments.

Referring to FIG. 1, data movement software 106 may be executed on a computing system 100 to facilitate direct memory access (DMA). In accordance with one embodiment, an operating system 102 and application 104 may be also executed concurrently on the computing system 100. The computing system 100 may comprise a software environment, wherein the data movement software 106 may be implemented, as provided in further detail below.

Figure 2:
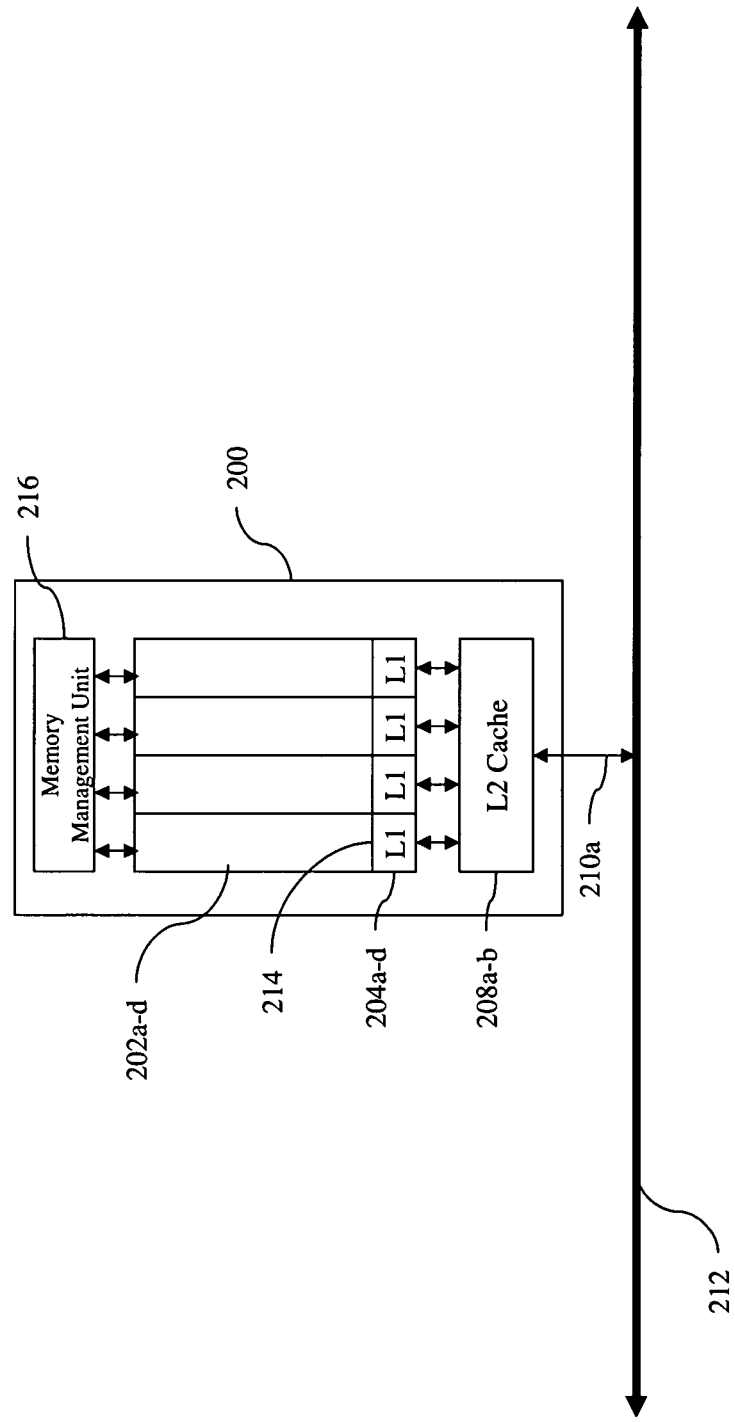
FIG. 2 illustrates an exemplary on-chip implementation in accordance with one or more embodiments.

Referring to FIG. 2, the computing system 100 may comprise an electronic unit 200 (e.g., a chip) coupled to a bus 212. The computing system 100 may comprise more than one electronic unit 200 depending on implementation. In an exemplary embodiment, the electronic unit 200 may comprise multiple processing cores 202a-d, some or all of which may include one or more central processing units (CPUs).

The processing cores 202a-d may be configured to enable multithreading. For example, in accordance with one embodiment, each multithreaded core may be configured as a scalar design with a number of pipelined stages, and may quickly switch between threads when a thread is stalled due to a branch prediction fail, a cache miss, or other reasons.

In an exemplary embodiment, the processing cores 202a-d are coupled to corresponding caches 204a-d. Desirably, caches 204a-d may be dedicated caches for each processing core and implemented on the electronic unit 200 (i.e., on-chip design). Depending on implementation, one or more cache levels (e.g., L1, L2, L3, etc.) may be available. For the purpose of example, an L1 level cache implementation is shown in FIG. 2.

In accordance with one embodiment, one or more threads in the processing cores 202a-d may be reserved for a data movement thread 214 which may execute data movement functions. A thread may be reserved by allocating a dedicated register file for the data movement thread 214. Desirably, the software code for the data movement thread 214 is sufficiently small such that it may reside within the cache 204a dedicated to the core 202a configured for executing the data movement thread 214.

For example, an L1 instruction cache may be implemented to store the software code for data movement thread 214. In the case where the data source and destination are on electronic unit 200, e.g., both the source and the destination are in the on-chip cache, or the transfer is between an on-chip I/O device and the on-chip cache, data transfer is more efficient because no off-chip memory access is required.

In an exemplary embodiment, the data movement thread 214 may be configured to use virtual addresses or physical addresses. In accordance with one embodiment, translation from virtual addresses may be accomplished using a memory management unit (MMU) 216. The memory management unit 216 may be responsible for handling access to memory requested by the processing cores 202a-d. The memory management unit 216 may be implemented on the electronic unit 200 and coupled to one or more processing cores 202a-d.

Referring to FIGS. 1 and 2, the data movement software 106 may be configured to utilize virtual addresses instead of physical memory addresses to implement a DMA engine. By taking advantage of logic provided by the memory management unit 216 (e.g., a translation lookaside buffer (TLB), a translation table walk, etc.) along with memory management capabilities provided by an operating system 102 (e.g., page fault and page swap mechanisms), the data movement software 106 allows for a fast translation without requiring a system call to pin down the memory region.

Figure 3:
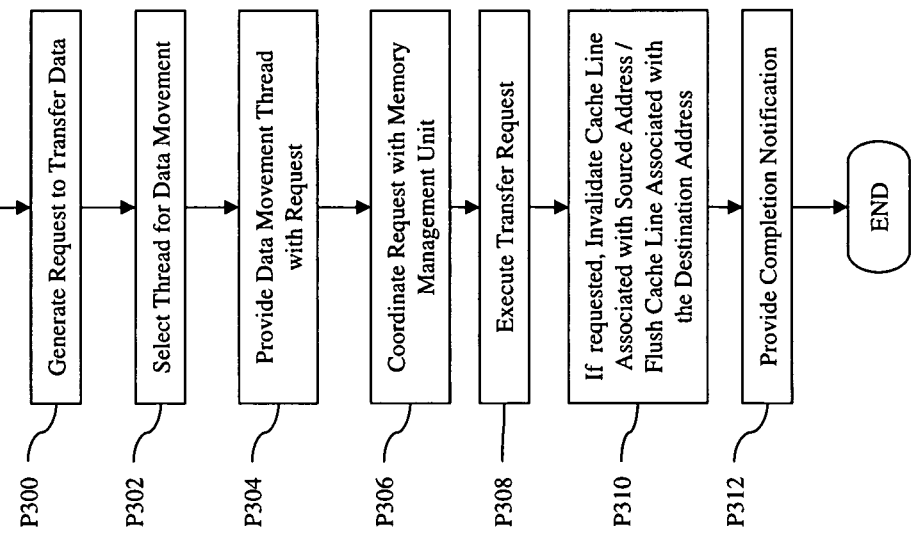
FIG. 3 illustrates a flow diagram of an exemplary data transfer operation in accordance with one or more embodiments.

Referring also to FIG. 3, the data movement software 106 may generate a request (e.g., a DMA request) to transfer data (P300). The request may be to transfer the data to another memory location, an I/O device, or to another processing engine for additional processing. The request and associated data may be from an application 104 executing on the computing system 100 or an I/O device.

In an exemplary embodiment, the request may include additional information relevant to data movement, such as address space identification, source address, destination address, data length, flags to enable/disable invalidate source cache lines, and flags to enable/disable flush destination cache lines. This information may be provided as arguments to the data movement software 106. The request from the application or the network may be queued in a data movement command queue, for example.

Upon generating the request, the data mover software 106 may select a thread (e.g., data movement thread 214) to move the data (P302). For example, a thread on one or more processing cores 202a-d may be dedicated to a data movement thread 214. Desirably, the data movement thread 214 is chosen so it will execute on the same core as the processing engine to which the data is being transferred. That is, the data movement thread 214 may be executed on the core that is executing the application 104 that will receive the data (i.e., destination application).

For example, if the application 104 is executing on one core 202a, a data movement thread 214 is chosen on the same core 202a. This allows the data movement thread 214 and the application 104 to share the same dedicated cache 204a, which improves cache locality. In another embodiment, a data movement thread 214 may be created dynamically on a chosen processing core 202a-d in the case where the chosen processing core 202a-d does not include a thread reserved for data movement.

The data movement thread 214 may directly load the data to be used by application 104 executing on the electronic unit 200 directly into the on-chip cache (e.g., the L1 or L2 cache). Thus, it may be possible that the cache 204a closest to the core 202a (e.g., L1 cache) is utilized by the data transfer and a cache coherency protocol will not pollute other layers of cache (e.g., L2 cache) on the electronic unit 200. Advantageously, there will be no need for the data to be transferred into cache located off-chip and then loaded back into on-chip cache, using application 104.

In accordance with one embodiment, once the data movement thread 214 is selected, it is provided with the request to transfer the data (P304). The request provides the data movement thread 214 with information relevant to the data movement which may accompany the request, for example. Depending on implementation, if the request is placed in a command queue, the data movement thread 214 may obtain the request from the command queue.

In an exemplary embodiment, the data movement thread 214 coordinates with the memory management unit 216 to service the data movement request (P306). For example, the data movement thread 214 provides the memory management unit 216 with information relating to the address space to be operated in, such that the memory management unit 216 may translate a virtual address to a physical address.

The data movement thread 214 executes the transfer request (P308). If the data is being transferred to another memory location, for example, the data movement thread 214 may execute instructions for a memory copy operation. In a situation where the data movement thread 214 and the application 104 are executing on the same core 202a, two copies of the data in the cache 204a may be created, one associated with the source address and the other associated with the destination address.

To eliminate the above noted redundancy, cache line invalidation or cache line flushing schemes may be utilized to configure the data movement thread 214 to remove the redundant data from the cache. Depending on whether the data in the cache is designated for copying to a destination, or whether the data in the cache is copied from a source, data movement thread 214 is configured to either invalidate the cache line associated with the source, or flush the cache line associated with the destination (P310).

Invalidation results in deletion of the data from the cache, while flushing results in moving the data from the cache to the memory, in case the data needs to be preserved (e.g., when the cached data is to be written to a destination). Invalidating the cache line does not cause other residing cache lines being used by the other threads on the electronic unit 200 to be deleted. Desirably, the data movement thread 214 is configured to invalidate a cache line after a line size data transfer. It is noteworthy that cache line invalidation may be optionally disabled to preserve the source data in caches.

In some embodiments, if flushing of destination cache lines is enabled for a given request, data movement thread 214 is also configured to flush the cache line associated with the destination address, for example, in case there is output data to be accessed by an I/O device accesses output data (e.g., network transmit).

In a certain embodiment, subsequent data movements may use the cache line made available by way of the above-noted invalidation scheme. In another embodiment, other features for not disturbing the cache (i.e., non-cacheable data access) may be used for data movement. The data associated with the source address may remain cached depending on implementation.

In accordance with one embodiment, the data movement thread 214 may provide an asynchronous completion notification after data is transferred to the destination (P312). The data movement thread 214 may deliver the status of operation (e.g., by way of a completion queue) to the requester (i.e., destination application 104), indicating that the transferred data may be accessed. In alternative embodiments, the data movement thread 214 may provide an interrupt, or implement a status register that may be polled by the destination entity.

In some embodiments, multiple data movement threads 214 may carry out a request to transfer data. The data movement software 206 may select the threads based on proximity to application 104 to access the data directly from cache.

In an exemplary embodiment, application 104 and data movement thread 214 may access the data from the same cache 204a-d, if application 104 and data movement thread 214 are executing on the same core 202a-d. That is, since application 104 and data movement thread 214 share the same cache, the data transfer is performed using the same cache. For example, if the application 104 and the data movement thread 214 are executing on the same core 202a, the application 104 may access the data from the dedicated cache 204a.

In an alternative embodiment, data may be accessed on another cache (e.g., in a case where the application 104 executes on a different core than the data movement thread 214) through an intercache communication protocol (e.g., MESI protocol). In the case where the data is too large (i.e., the data size cannot not fit on the on-chip cache), some portion of the data may be flushed to off-chip memory. In such a situation, the system may suffer a performance penalty to access the data from memory as opposed to the on-chip cache.

To improve performance, the system hardware may be modified and enhanced. For example, in accordance with one embodiment, write combining may allow for better bus utilization by reading one cache line size and then writing the cache line desirably in a single burst.

In different embodiments, the invention can be implemented either entirely in the form of hardware or entirely in the form of software, or a combination of both hardware and software elements. For example, computing system 100 may comprise a controlled computing system environment that can be presented largely in terms of hardware components and software code executed to perform processes that achieve the results contemplated by the system of the present invention.

Figure 4:
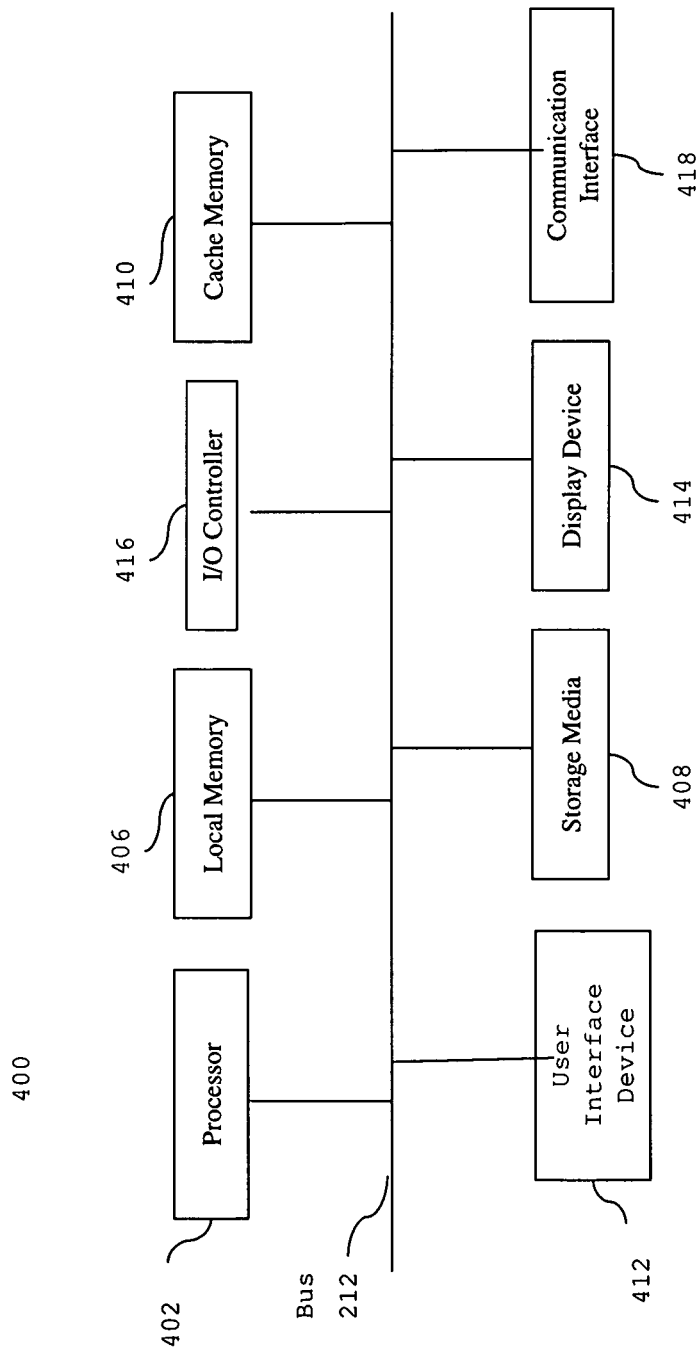
FIGS. 4 and 5 are block diagrams of hardware and software environments in which a system of the present invention may operate, in accordance with one or more embodiments.
Figure 5:
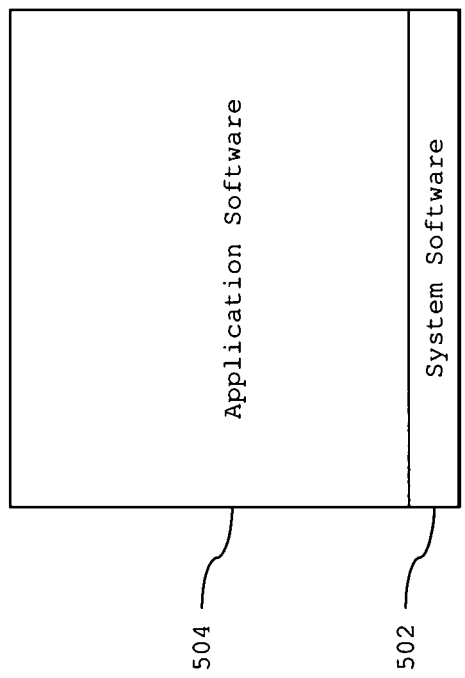

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, data movement software 106 may be implemented as system software 502 executed on one or more hardware environments to facilitate direct memory access. System software 502 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 102 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for facilitating direct memory access, the method comprising:

an application submitting a request to a data movement software to transfer data from a virtual source memory address to a virtual destination memory address, wherein the application is executed on a first core among a plurality of cores in a multi-core processor chip, wherein the first core is associated with a first on-chip cache exclusively dedicated to the first core, wherein at least a second core from among said plurality of cores is associated with a second on-chip cache exclusively dedicated to the second core, wherein a first data movement thread associated with the data movement software is reserved by way of allocating a dedicated register file within the first on-chip cache, such that logic code for the first data movement thread fully resides within the first on-chip cache dedicated to the first core, wherein the data movement software, in response to determining that the application is executed on the first core, selects the first data movement thread to run on the first core to service the submitted request, wherein the first data movement thread shares the first on-chip cache with the application while both the first data movement thread and the application are executed on the first core;

wherein the first data movement thread directly loads the data requested by the application to the first on-chip cache based on the virtual source memory address and the destination memory address information included in the request submitted by the application, instead of the first data movement thread copying the requested data first into a secondary on-chip cache sharable by the plurality of cores and then copying of the requested data from the secondary on-chip cache to the first on-chip cache, wherein a memory management unit (MMU) for the multi-core processor chip is provided with the virtual source memory address and the virtual destination memory address, wherein the MMU translates the virtual source memory address and the virtual destination memory address into a respective physical source memory address and a physical destination memory address, without requiring a system call to pin down a memory region associated with the respective physical source memory address and the physical destination memory address, wherein the data movement software transfers the requested data from the physical source memory address to the physical destination memory address according to the MMU's translation, and wherein in response to determining that duplicate copies of the requested data are created in the first on-chip cache as the result of the transfer of the data, a cache line invalidation or a cache line flushing scheme is utilized to remove a duplicate copy.

2. The method of claim 1, further comprising:

coordinating the request with the memory management unit, such that virtual addresses may be used to transfer data when the first thread provides the memory management unit with information relating to an address space to be operated in.

3. The method of claim 2, wherein the information for carrying out the requested data transfer may comprise at least one of address space identification, a source address, a destination address, a data length or a combination thereof.

4. The method of claim 3, further comprising invalidating a cache line in the first on-chip cache, when the cache line is associated with the physical source memory address and a copy of the data in the cache line is included in the first on-chip cache.

5. The method of claim 3, further comprising flushing a cache line in the first on-chip cache, when the cache line is associated with the physical destination memory address and a copy of the data in the cache line is included in the first on-chip cache.

6. The method of claim 1, further comprising:

providing asynchronous completion notification to an application requesting the data transfer, such that the application may access the transferred data.

7. The method of claim 1, wherein the first thread is created dynamically on a chosen processing core.

8. The method of claim 1, wherein the first thread uses the same cache as an application requesting the data transfer to improve cache locality.

9. A system comprising:

one or more processing cores, each core comprising one or more processors;

memory for storing data and communicating the data to the one or more processors over a data communication interface;

an application submitting a request to a data movement software to transfer data from a virtual source memory address to a virtual destination memory address, wherein the application is executed on a first core among a plurality of cores in a multi-core processor chip, wherein the first core is associated with a first on-chip cache exclusively dedicated to the first core, and wherein at least a second core from among said plurality of cores is associated with a second on-chip cache exclusively dedicated to the second core, wherein a first data movement thread associated with the data movement software is reserved by way of allocating a dedicated register file within the first on-chip cache, such that logic code for the first data movement thread fully resides within the first on-chip cache dedicated to the first core, wherein the data movement software, in response to determining that the application is executed on the first core, selects the first data movement thread to run on the first core to service the submitted request, wherein the first data movement thread shares the first on-chip cache with the application, while both the first data movement thread and the application are executed on the first core;

wherein the first data movement thread directly loads the data requested by the application data to the first on-chip cache based on the virtual source memory address and the destination memory address information included in the request submitted by the application, instead of the first data movement thread copying the requested data first into a secondary on-chip cache sharable by the plurality of cores and then copying of the requested data from the secondary on-chip cache to the first on-chip cache;

wherein a memory management unit (MMU) for the multi-core processor chip is provided with the virtual source memory address and the virtual destination memory address, wherein the MMU translates the virtual source memory address and the virtual destination memory address into a respective physical addresses for the source memory address and the destination memory address, without requiring a system call to pin down a memory region associated with the respective physical source memory address and the physical destination memory address, wherein the data movement software transfers the requested data from the physical source memory address to the physical destination memory address according to the MMU's translation, and wherein in response to determining that duplicate copies of the requested data are created in the first on-chip cache as the result of the transfer of the data, a cache line invalidation or a cache line flushing scheme is utilized to remove the duplicate copy.

10. The system of claim 9, wherein the data movement software coordinates the request with the memory management unit, such that virtual addresses may be used to transfer data when the first thread provides the memory management unit with information relating to an address space to be operated in.

11. The system of claim 10, wherein the information for carrying out the requested data transfer comprises at least one of an address space identification, a source address, a destination address, a data length or a combination thereof.

12. The system of claim 11, wherein the data movement software invalidates a cache line in the first chip cache, when the cache line is associated with the physical source memory address and a copy of the data in the cache line is included in the first on-chip cache.

13. The system of claim 11, wherein the data movement software flushes a cache line in the first on-chip cache, when the cache line is associated with the physical destination memory address and a copy of the data in the cache line is included in the first on-chip cache.

14. The system of claim 9, wherein the data movement software provides an asynchronous completion notification to an application requesting the data transfer, such that the application may access the transferred data.

15. The system of claim 9, wherein the first thread is created dynamically on a chosen processing core.

16. The system of claim 9, wherein the first thread uses the same cache as an application requesting the data transfer to improve cache locality.

17. A computer program product comprising a non-transitory computer usable medium including computer readable program code for facilitating direct memory access in a computing system in response to receiving a request to transfer data, wherein execution of the program code on a computer causes the computer to:

submit a request to a data movement software to transfer data from a virtual source memory address to a virtual destination memory address, wherein an application is executed on a first core among a plurality of cores in a multi-core processor chip, wherein the first core is associated with a first on-chip cache exclusively dedicated to the first core, wherein at least a second core from among said plurality of cores is associated with a second on-chip cache exclusively dedicated to the second core, wherein a first data movement thread associated with the data movement software is reserved by way of allocating a dedicated register file within the first on-chip cache, such that logic code for the first data movement thread fully resides within the first on-chip cache dedicated to the first core, wherein the data movement software, in response to determining that the application is executed on the first core, selects the first data movement thread to run on the first core to service the submitted request, wherein the first data movement thread shares the first on-chip cache with the application while both the first data movement thread and the application are executed on the first core;

wherein the first data movement thread directly loads the data requested by the application to the first on-chip cache based on the virtual source memory address and the destination memory address information included in the request submitted by the application, instead of the first data movement thread copying the requested data first into a secondary on-chip cache sharable by the plurality of cores and then copying of the requested data from the secondary on-chip cache to the first on-chip cache, wherein a memory management unit (MMU) for the multi-core processor chip is provided with: the virtual source memory address and the virtual destination memory address, wherein the MMU translates the virtual source memory address and the virtual destination memory address into respective physical source memory address and physical destination memory address, without requiring a system call to pin down a memory region associated with the respective physical source memory address and the physical destination memory address, wherein the data movement software transfers the requested data from the physical source memory address to the physical destination memory address according to the MMU's translation, and wherein in response to determining that duplicate copies of the requested data are created in the first on-chip cache as the result of the transfer of the data, a cache line invalidation or a cache line flushing scheme is utilized to remove the duplicate copy.

18. The computer program product of claim 17, wherein execution of the program code further causes the computer to coordinate the request with a memory management unit, such that virtual addresses may be used to transfer data when the first thread provides the memory management unit with information relating to an address space to be operated in.

19. The computer program product of claim 18, wherein the information for carrying out the requested data transfer may comprise address space identification, a source address, a destination address, or a data length.

20. The computer program product of claim 17, wherein the first thread is created dynamically on a chosen processing core, and wherein the first thread uses the same cache as an application requesting the data transfer to improve cache locality.

* * * * *